United States Patent

[11] 3,623,956

[72] Inventor George Kalabokias
 Seclin, France
[21] Appl. No. 4,739
[22] Filed Jan. 21, 1970
[45] Patented Nov. 30, 1971
[73] Assignee Societe Rapidase, S.A.
 Seclin, France

[54] PREPARATION OF MICROBIAL ALKALINE PROTEASE BY FERMENTATION WITH BACILLUS SUBTILIS, VARIETY LICHENIFORMIS
 6 Claims, No Drawings

[52] U.S. Cl..................................................... 195/66 R,
 195/117
[51] Int. Cl...................................................... C12d 13/06

[50] Field of Search............................................. 195/66, 62,
 115, 117

[56] References Cited
 FOREIGN PATENTS
 162,517 4/1955 Australia..................... 195/66
 OTHER REFERENCES
 Dissertation Abstracts Vol. 27 pp. 2277 B-2278 B (1966).

*Primary Examiner*—Lionel M. Shapiro
*Attorneys*—Walter C. Kehm and W. Garrettson Ellis ABSTRACT: Alkaline protease is prepared by culturing a micro-organism of the species *Bacillus subtilis*, variety *licheniformis* in a nutrient medium with frequent incremental additions of carbohydrate.

PREPARATION OF MICROBIAL ALKALINE PROTEASE BY FERMENTATION WITH BACILLUS SUBTILIS, VARIETY LICHENIFORMIS

BACKGROUND OF THE INVENTION

The term "alkaline protease" stands for a class of proteolytic enzymes which are operative in the alkaline pH range, e.g. about pH 8 to 11.5. These materials show great promise as cleaning agents for removing stains from clothing in the frequent cases in which the stains have protein components. A further advantage of these materials is that they can generally be used in conjunction with commercial detergents. Thus, detergent formulations are available which contain alkaline protease for improving the performance of the formulations.

It is presently known to the art to produce alkaline protease by culturing the organism *Bacillus subtilis*. However, many organisms of this species give a low yield of alkaline protease, and thus the production of the material from these organisms is inefficient and expensive.

It has been found that *licheniformis* variety of the organism *Bacillus subtilis* gives greatly improved yields of alkaline protease when compared with other varieties of *Bacillus subtilis*, and as such provides a substantial advantage in the preparation of alkaline protease because of the substantial gains in production efficiency obtained by use of the organism. *Licheniformis* is considered by some authorities to be a separate species from *subtilis*. However, it is very similar to *subtilis*, and is considered as a subspecies or variety thereof for purposes of this application.

The protease produced from *licheniformis* is separated from the culture, preferably by precipitation with methanol or another nonaqueous, polar solvent.

The alkaline protease produced by this invention generally has greater activity at higher temperatures than other alkaline proteases, facilitating its use in automatic washing machines.

DESCRIPTION OF THE INVENTION

*Licheniformis* organisms are cultured in a nutrient medium with periodic incremental additions of soluble carbohydrate during a major portion of the culturing period to maintain a reducing sugar level of about 0.1 to 2 weight percent, and preferably 0.4 to 1 weight percent, of the culture medium. Preferably, the culturing is performed under aerobic conditions at a temperature of 30° to 40° C. and at a pH of 5.0 to 8.0 throughout the period of culturing in order to obtain an advantageously high yield of alkaline protease.

One advantage of the use of *licheniformis* is that it gives a low yield of amylase byproduct, while other high yield protease-producing organisms tend to produce large amounts of amylase.

It is particularly preferred to maintain a pH of 6.0 to 6.6 and a temperature of 34° to 38° C. throughout the culturing step.

The frequent addition of soluble carbohydrates during the culturing step of this invention in small increments to maintain the above-stated reducing sugar concentration enhances the growth of the organism and the production of alkaline protease to an unexpected degree.

Generally, degraded starch is used as a carbohydrate source. The starch can be degraded to a reduced molecular weight in many ways, e.g., by the use of enzymes, by heat, by acid, or by any other desired means.

The initial nutrient medium into which *Bacillus subtillis*, variety *licheniformis* is introduced generally has a carbohydrate content of about 10 to 20 weight percent. After the reducing sugar level of the nutrient medium has been reduced to less than about 2 weight percent by metabolic action of the micro-organism, more carbohydrate is generally added in frequent increments as described above.

The reducing sugar level can be determined colorimetrically with a Klett colorimeter, using a 54 filter (540 m$\mu$). The reduction of dinitrosalicylic acid by the medium to be tested is measured and compared with a glucose standard in distilled water. The reducing sugar level is then calculated on a glucose basis, that is, making the assumption that the only reducing agent present is glucose, and calculating the assumed glucose concentration as the reducing sugar level.

After the culturing has proceeded, generally for a period of time to produce a maximum yield of alkaline protease, the protease is typically separated from the rest of the medium. This can be done by filtering the medium to remove extraneous solids, washing the solids, and then precipitating alkaline protease from the filtrate.

Polar solvents having a low water content are generally useful to precipitate the alkaline protease from a culture filtrate. Typical solvent which can be used are acetone, diethylether, and alcohols of no more than about three carbon atoms such as methanol, ethanol and isopropanol. Mixtures of polar solvents can also be used. Another class of materials for precipitating alkaline protease from a culture filtrate are the soluble salts, for example, ammonium sulfate, sodium sulfate, potassium nitrate, and sodium chloride.

Prior to precipitation of alkaline protease from the filtrate of the culture, it is desirable to evaporate the culture filtrate and added wash solution to about 30 to 40 percent of its initial weight. The alkaline protease is then precipitated from the evaporate, preferably with an alcohol having no more than three carbon atoms such as methanol.

The protease so produced generally has a maximum proteolytic activity in a temperature range of about 57° to 67° C. at pH 8.5.

The following example is for illustrative purposes only and is not to be construed as limiting the invention of this application.

EXAMPLE 1

(A) A culture of *Bacillus subtilis*, variety *licheniformis* was grown under aerobic conditions in a culture medium having a pH of 6.0 to 6.7 at a temperature of 35° to 37° C. The culture medium contained the following constituents:

| | |
|---|---|
| Amylase degraded corn starch | 30 weight percent |
| Pressed yeast | 0.1 to 0.8 weight percent |
| Corn steep liquor | 0.9 to 2.5 weight percent |
| Lactose | 0.1 to 0.5 weight percent |
| Phosphoric acid | 0.5 to 1.8 weight percent |
| Calcium carbonate | 1 weight percent |
| Magnesium sulfate | trace |
| Manganese sulfate | trace |
| Zinc sulfate | trace |
| Copper sulfate | trace |
| Iron carbonate | trace |
| Water | balance |

As growth of the organism caused the reducing sugar level to decline below 1 percent, more amylase degraded starch was added in frequent increments to maintain the reducing sugar level between about 0.1 and 2 weight percent.

After fermentation for 50 to 60 hours, about 29,000 protease activity units per ml. were found in the culture mash. The protease is precipitated with methanol and filtered.

(B) Repetition of the above experiment without the addition of degraded starch in frequency increments resulted in a maximum yield of about 20,000 protease activity units per ml. after about 40 hours of fermentation.

The protease activity units were calculated as follows:

A buffer solution of 3.0 grams of tris-(hydroxymethyl) aminomethane (known as "Tris"), mixed with 400 ml. of distilled water is prepared and titrated with 1 N Hydrochloric acid to pH 8.5 while stirring. Distilled water is then added to make a volume of 500 ml.

A substrate solution is made by adding 1.3 grams of casein to 80 ml. of a 0.05 M "Tris" buffer at pH 7.6 and stirred with heating to dissolve the casein. After cooling, additional buffer solution is added to made a volume of 100 ml.

A mixture to which the enzyme-containing products prepared in the fermentation described above is added is made in a series of test tubes by mixing in each tube 3 ml. of the above substrate solution, 3 ml. of 0.02 N sodium hydroxide solution, and 3 ml. of 0.014 M sodium tripolyphosphate solution brought to pH 8.5 with HCl. The tubes are closed with stoppers and brought to a temperature of 37° C. The pH should be 8.5 or above.

A watch with a second hand is consulted, and at a given time, 3 ml. of an enzyme solution containing the alkaline protease to be assayed is added to each test tube, except to a control "substrate blank" which instead receives 3 ml. of the buffer solution prepared above. Tubes are mixed for at least 30 seconds by tapping the tube walls and then incubating at 37° C. Exactly 15 minutes after adding the enzyme solution, there is added to each tube 10 grams of trichloroacetic acid solution prepared by adding 18 grams of trichloroacetic acid, 19 grams of sodium acetate and 18.9 ml. of glacial acetic acid to a container, and then diluted to 1 liter with distilled water. This mixture destroys the enzyme and prevents further hydrolyzing by the enzyme of the casein present. The contents of each tube are then filtered through 11 cm. Whatman No. 42 paper with the first portion of the filtrate being refiltered through the paper.

Simultaneously, an "enzyme blank" is prepared by incubating 5 ml. of the enzyme solution for 15 minutes at 37° C. The solution is then added to a mixture of 3 ml. each of substrate solution, 0.2 N sodium hydroxide, and 0.044 M sodium tripolyphosphate after the mixture has been incubated for 15 minutes at 37° C., and 10 ml. of the above trichloroacetic acid solution added. After adding the enzyme solution, the mixture is incubated again at 37° C. with occasional shaking for one-half hour and filtered.

The optical densities of each of the above filtrates are then determined at 275 m$\mu$ using a 10 mm. cell and a spectrophotometer which is set with the 100 percent transmission point being the reading of the "substrate blank" prepared above. The readings are then corrected by subtracting the optical density of the "enzyme blank" prepared above from the optical densities of the other test solutions.

The amount of alkaline protease present is then expressed in activity units which are calculated by the following formula:

$$\text{Protease activity units} = \frac{\text{The corrected optical density at 275 m}\mu\text{, of the hydrolyzate mixture in the test tube}}{\text{The optical density at 275 m}\mu\text{ of 1.5 mg. tyrosine per ml. (i.e. 0.0114)}} \times \frac{\text{Volume (i.e. 22 ml.)}}{\text{Time (i.e. 15 minutes)}}$$

In short, one activity unit is that amount of enzyme which produces in 1 minute, under the conditions of the above test, enough tyrosine and other materials by hydrolyzing casein to provide an optical density at 275 m$\mu$. which is the same as a tyrosine solution containing 1.5 mg. of tyrosine per ml.

EXAMPLE 2

Generally equivalent results are obtained when the experiments of examples 1(A) and 1(B) are repeated utilizing a culture medium containing only 3.5 weight percent of the amylase degraded corn starch, the remaining corn starch being replaced by water, and the fermentation is run at a temperature of 37° to 42° C. for 70 to 80 hours.

EXAMPLE 3

(A) A culture of Bacillus subtilis, variety licheniformis was heated at 60° C. for 20 minutes in a 0.85 percent sodium chloride solution, inoculated onto a potato plug, and grown for 24 hours at 37° C. Following this, portions of the potato plug were added to 1,000 ml. of a mixture containing 4 grams of dextrose, 5 grams of sodium chloride, 10 grams of triptone, 3 grams of beef extract, 1 gram of k$_2$HPO$_4$, 3 grams of yeast extract, and the balance water. This mixture was incubated for 18 hours at 37° C. on a rotary shaker to form a bacterial inoculum.

A mash composition was prepared containing the following ingredients:

| Ingredient | Parts by weight of Ingredient |
|---|---|
| Amylase degraded starch solution (45 weight percent starch) | 124.0 |
| Lactose | 4.3 |
| K$_4$HPO$_4$ | 4.3 |
| Corn steep liquor | 26.0 |
| Phosphoric acid (75%) | 12.9 |
| Brewer's yeast | 7.2 |
| Soy protein (Kaysoy) | 3.65 |
| Calcium carbonate | 2.88 |
| Hydrated magnesium sulfate | 1.25 |
| Sodium chloride | 0.72 |
| A mixture of 5 parts by weight of bran and 4 parts by weight of lard oil | 9.0 |
| Hydrated ferrous sulfate | trace |
| Hydrated manganese sulfate | trace |
| Hydrated zinc sulfate | trace |
| Water | Sufficient to make a total weight of 1000 parts by weight |

The above mash is batch sterilized for 45 minutes at 125° to 130° C., and cooled to 35° to 37° C. Sterile ammonia is added to provide a pH of 6.3 to 6.6. About 0.3 weight percent of the bacterial inoculum previously prepared is added to the mash, and fermentation is allowed to proceed for about 20 hours with aeration and agitation. During this period the temperature is maintained at 35° to 37° C., and the pH is maintained between 6.1 and 6.5 by periodic addition of ammonia.

Following this, another mash composition similar to the above mash is prepared, except that 372 parts by weight of the 45 percent amylase-degraded starch solution is added, with correspondingly less water being added. The mash is batch sterilized under the previously described conditions, cooled to 35° to 37° C., and ammonia added to provide a pH of 6.4 to 6.6.

About 80 parts by weight of the previously fermented mash are added to the new mash composition, and fermentation is allowed to proceed for 58 hours under the previous fermentation conditions. The carbohydrate content of the fermentation mixture is periodically assayed, and periodic additions of about 17 parts by weight of the above amylase-degraded starch solution are performed to maintain the reducing sugar level between 0.4 and 1 weight percent. Typically, the carbohydrate additions are made at 3-hour intervals.

The alkaline protease present was assayed by the method described below to give the following results:

| Hours of Fermentation | Protease Activity Units per ml. |
|---|---|
| 34 | 2,784 |
| 42 | 23,865 |
| 46 | 24,166 |
| 50 | 24,682 |
| 58 | 23,693 |

The resulting mash was then filtered and the filter residue washed with tap water.

The filtrate was evaporated to a concentration of about 18° Be. and was then cooled to 3° C. and adjusted to a slightly acid pH. Methanol was added to give a methanol concentration of about 80 percent of precipitate the protease, which was then filtered away from the liquid phase.

The alkaline protease produced by the above process exhibits a maximum proteolytic activity at about 60° to 65° C., measured by its hydrolysis of casein for 10 minutes at pH 8.5. The alkaline protease exhibits maximum proteolytic activity at about pH 10 at a temperature of 37° C. and at about pH 9.6 at 61° C.

(B) The above experiment was repeated except that no increments of enzyme-degraded starch solution were added during the fermentation time period. The following results were obtained:

| Hours of Fermentation | Protease Activity Units per ml. |
| --- | --- |
| 30 | 13,118 |
| 34 | 15,930 |
| 42 | 10,395 |

The protease activity units of this example are as defined in example 1.

What is claimed is:

1. The process of culturing a micro-organism of the species *Bacillus subtilis*, variety *licheniformis* aerobically in a nutrient medium at a pH of 5.0 to 8.0 in which, during a major portion of the period of culturing of the micro-organism water-soluble carbohydrate is frequently added in increments to maintain a reducing sugar level in said medium between about 0.1 and 2 weight percent, and thereafter separating alkaline protease from said medium 2. The process of claim 1 in which said carbohydrate is added as a degraded starch.

3. The process of claim 2 in which said temperature is 30° to 40° C.

4. The process of claim 1 in which said temperature is 34° to 38° C. and said pH is 6.0 to 6.6.

5. The process of claim 4 in which said reducing sugar level is maintained between 0.4 and 1 weight percent.

6. The process of claim 4 in which said micro-organism is cultured by placing it in a nutrient medium having from about 10 to 20 weight percent of carbohydrate in the form of degraded starch, based on the weight of the nutrient medium, and in which, after said carbohydrate has been reduced to less than about 2 weight percent by micro-organism metabolic action, carbohydrate is added in frequent increments to maintain the reducing sugar level in said medium between about 0.4 and 1 weight percent.

* * * * *